Feb. 9, 1943.   H. M. WOLFSON   2,310,335
ELECTRICAL APPARATUS
Filed Jan. 10, 1941
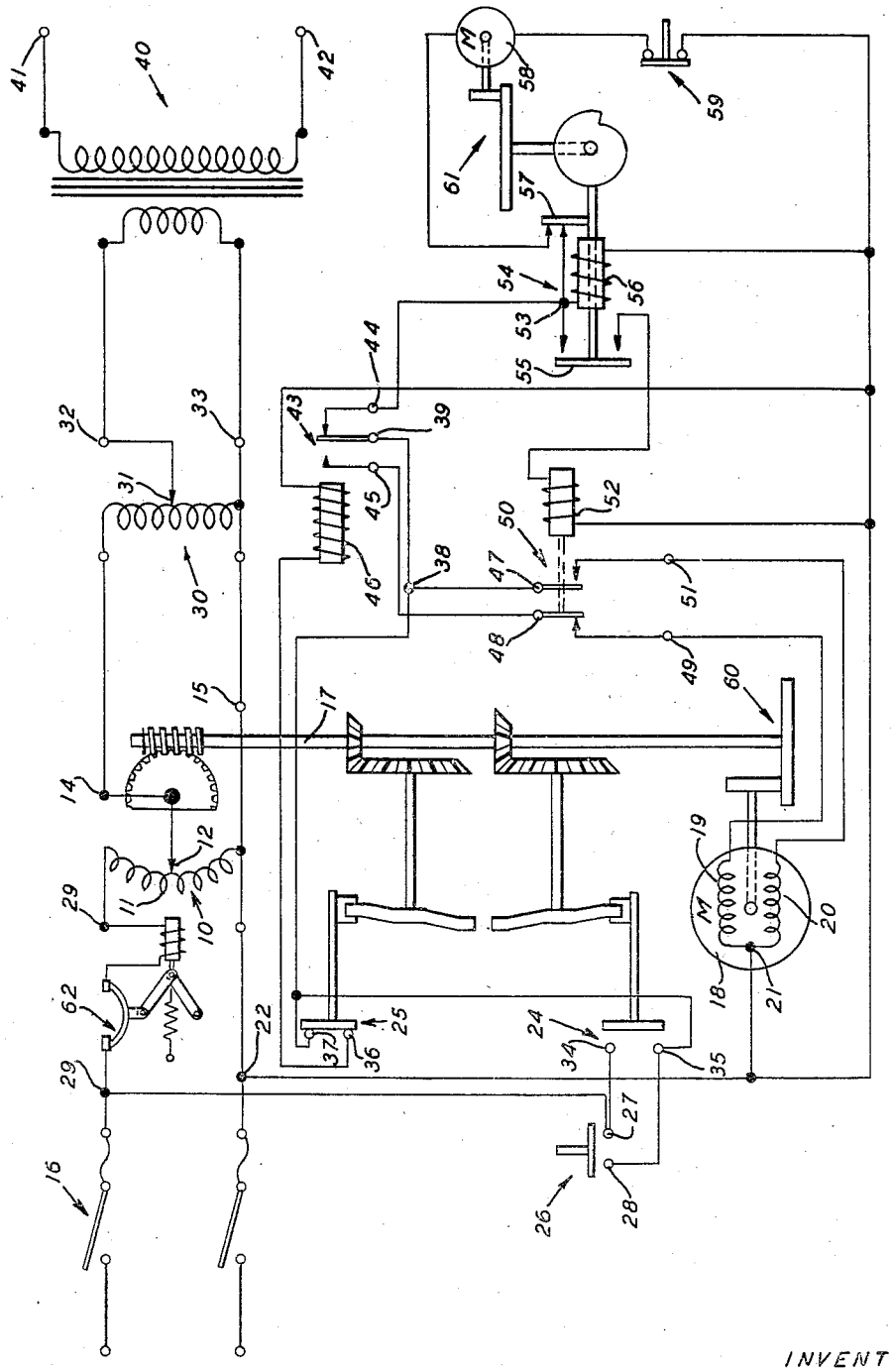
INVENTOR
H.M. WOLFSON
BY
E.R. Nowlan
ATTORNEY Patented Feb. 9, 1943

2,310,335

UNITED STATES PATENT OFFICE 2,310,335

ELECTRICAL APPARATUS

Henry M. Wolfson, New York, N. Y., assignor to Western Electric Company, Incorporated, New York, N. Y., a corporation of New York Application January 10, 1941, Serial No. 373,968

10 Claims. (Cl. 171—119)

This invention relates to an electrical apparatus, and more particularly to an electrical apparatus for supplying an accurately and controllably variable alternating electric potential There are in the electrical arts and especially in the manufacture of electrical apparatus used in communications, such as telephony and radio, innumerable instances where it is desirable to apply an alternating electric potential starting at a predetermined minimum value and increasing in a regular manner to a predetermined maximum value, e. g., in testing the electrical resistance, insulated breakdown point, and similar properties of materials or parts.

An object of the present invention is to produce apparatus capable, when connected to an ordinary source of alternating electric current such as commercial 110 volt A. C., of supplying an alternating potential, varying continuously during a predetermined time interval from a predetermined minimum value to a predetermined maximum value.

With the above and other objects in view, the invention may be embodied in an apparatus comprising a variable autotransformer driven by a reversible motor to deliver a voltage varying continuously from a minimum to a maximum value and back to the minimum value in combination with a time controlled relay to hold the potential at maximum value for a predetermined interval.

Other objects and features of the invention will appear from the following detailed description of one embodiment thereof taken in connection with accompanying drawing in which the single figure is a diagrammatically schematic representation of an apparatus constructed in accordance with the invention for testing the dielectric strength of materials.

As herein disclosed, the characteristic essentials and features only of the apparatus are disclosed, auxiliary safety devices and features not relevant to the invention being omitted for clarity of presentation, and, in like manner, details of construction of component devices being omitted as constituting no part of the invention.

A variable output voltage autotransformer generally indicated at 10 may be thought of as having a winding 11, a movable contact 12 connected to a fixed output terminal 14, and a fixed output terminal 15. The transformer may be fed with alternating current, e. g., 110 volt commercial A. C., through a main switch generally indicated at 16. The output voltage at 14 and 15 is least when the contact 12 is in its lowest position and greatest when the contact 12 is in its highest position. The contact 12 is continuously movable from one position to the other by a mechanical member (shaft, lever, cam or the like) 17 actuated by a reversible, preferably synchronous, electric motor 18. As shown, this motor is reversible by alternative energization of two field windings 19 and 20, so arranged that when the winding 19 is energized, the contact 12 is driven up and when the winding 20 is energized, the contact 12 is driven down. Both field windings are connected to a common terminal 21 and thence to the lower side of the supply mains at 22.

A second manually adjustable variable voltage output autotransformer generally indicated at 30 receives the output of the transformer 10 and has an adjustable contact 31 connected to a fixed output terminal 32, and a second output terminal 33.

A fixed ratio high potential transformer generally indicated at 40 is fed by the transformer 30 and delivers the required testing potential at its terminals 41 and 42.

The member 17, beside driving the contact 12 of the transformer 10, also is arranged to actuate two snap switches 24 and 25. These are so arranged and adjusted that when the contact 12 is in its lowest position and the member 17 starts to drive the contact up, the switch 24, normally open when the contact 12 is in its lowest position, closes and remains closed until the contact 12 is returned to its lowest position when the switch 24 opens again. Also the switch 25, normally closed when the contact 12 is in its lowest position, is opened when the contact 12 reaches its highest position and remains open until the contact 12 reaches its lowest position when the switch 25 is closed again.

A starting button generaly indicated at 26 and having terminals 27 and 28, has its terminal 27 connected to the upper side of the power supply mains at 29 and also to one terminal 34 of the switch 24. The second terminal 28 of the button 26 is connected in series to the terminal 35 of the switch 24, the terminal 37 of the switch 25 and to a circuit branch point 38.

The branch point 38 is connected to the middle terminal 39 of a two-way relay generally indicated at 43 having outer terminals 44 and 45 and a winding 46. The branch point 38 is also connected to one input terminal 47 of a double relay generaly indicated at 50, the other input terminal 48 of which is connected to the output terminal 45 of the relay 43. The output terminals 49 and 51 of the relay 50, corresponding respectively to the input terminals 48 and 47, are respectively connected to the field coils 19 and 20 of the motor 18.

The output terminal 44 of the relay 43 is connected to a common input terminal 53 of a time controlled relay generally indicated at 54. The terminal 53 is connected through the normally open contact bar 55 of the relay 54 and thence through the winding 52 of the relay 50 to the lower side of the power supply mains at 22. The terminal 53 is also connected through the winding 56 of the relay 54 to the lower main at 22. The terminal 53 is also connected through the normally closed contact bar 57 of the relay 54 to a synchronous electric motor 58 which is part of and drives the relay 54 and thence through a normally closed stop button 59 to the lower main 22.

The terminal 36 of the switch 25 is connected through the winding 46 of the relay 43 to the lower main at 22.

Assuming that the apparatus is to be adjusted for use, an A. C. voltmeter or other standard is connected across the terminals 41 and 42, and the switch 16 is closed. The start button 26 is then closed. Current from the upper main at 29 flows through the closed button to the terminal 37 of the closed switch 25, thence through the coil 46 and back to the lower main at 22. The current also flows from terminal 37 through the relay 43 to the relay 54, energizing the coil 56 and the motor 58. The coil 56, however, cannot act to close the bar 55 until the motor 58 has run a predetermined number of revolutions, i. e. this being a synchronous motor, for a predetermined interval of time. This circuit is almost instantly broken, however, by the relay 43.

The energized coil 46 throws the two-way relay 43 over, and current passes through the terminal 45 from the terminal 37, and through the relay 50 to the field coil 19 of the motor which begins to run and to drive the contact 12 up. The member 17 then closes the snap switch 24, short circuiting the start button 26, which is then released to open without effect.

The contact 12 is now driven at constant speed by the member 17 driven by the motor 18, up along the coil 11, thus raising the voltage across 14 and 15 and therefore across 41 and 42 gradually and regularly. Observation of the meter across 41 and 42 discloses what adjustments of the apparatus, if any, are needed. When the contact 12 reaches its highest position, the switch 25 opens, the relay 43 returns to the position shown, the terminal 45 is deenergized and the power supply to the coil 19 of the motor 18 ceases, stopping the motor. The terminal 53 of the relay 54 is energized through the relay 43. The motor 58 of the relay 54 runs for a predetermined time interval during which the maximum voltage is applied across the terminals 41 and 42, and may be adjusted by adjusting the contact 31 of the transformer 30. The motor 58 then releases the relay 54 to close the bar 55, and allow current to pass through the coil 52 of the relay 50. Current then passes through the relay 50 and the coil 20 of the motor 18.

The motor 18 then drives the member 17 to draw the contact 12 down gradually and regularly reducing the voltage across the terminals 41 and 42 to the predetermined minimum when the contact 12 reaches its lowest position. The switch 25 then closes, the switch 24 opens; and, since the button 26 is open, the original status is restored.

The switch 16 is then opened and whatever adjustments between the contact 12 and the member 17, or between the motor 58 and the core of the relay 54, are necessary are made.

As shown, the lowest position of the contact 12 is about halfway down the coil 11, and the highest position is assumed to be at the top of the coil. The minimum voltage delivered across 14 and 15, and hence across 41 and 42 is therefore about half of the maximum voltage, but may be made any desired fraction of the maximum by adjusting the minimum or lowest point of travel of the contact 12. The time required to vary the voltage from minimum to maximum or vice versa may be adjustably varied by adjusting the speed ratio of the motor 18 to the member 17 by any suitable mechanical device 60. The time during which the maximum voltage is applied may be adjusted by a similar device 61 interposed between the motor 58 and the core of the relay 54. These being all well known mechanical devices and their particular modes of construction and operation being no part of the invention, it is not thought necessary to describe them in detail here.

The apparatus having been adjusted as described, a sample of material to be tested for dielectric strength is interposed between suitable electrodes connected to the terminals 41 and 42 and a suitable voltmeter or other indicating device is connected across the terminals in parallel therewith. The switch 16 is then closed and the start button 26 is closed. Operating as above described, the apparatus will then apply to the test sample a voltage commencing at the predetermined minimum, and increasing regularly during a predetermined time interval to the predetermined maximum value. The voltage is held at the maximum value for another predetermined time interval, and is then regularly diminished to the minimum value during a time interval equal to the interval required for its increase. Observation of the voltmeter will give the breakdown value of the sample if a breakdown occurs because of the momentary surge of potential and current occasioned thereby. Damage to the apparatus from such a surge may be obviated by the use of a suitable device such as a circuit breaker 62. The test being completed and the cycle of operation of the apparatus ended, the switch 16 is opened, and the sample removed. The apparatus is then ready for another test.

It will evidently not be necessary in all cases to employ the transformer 40 at all, in case current of sufficiently high potential for a limited purpose is available to be fed to the switch 16. Also if the range of adaptability required of the apparatus is not too great, the transformer 30 may be dispensed with while the transformer 40 is retained. Or, in some cases, both of the transformers 30 and 40 may be omitted.

If it be desired to have a D. C. voltage at the testing terminals instead of an A. C. voltage, the devices 10 and 30 might be potentiometers, i. e., variable resistances, mechanically constructed and actuatable in substantially the same manner as the transformers disclosed above. Then if a high direct current voltage be fed to the switch 16 and if the entire transformer 40 be omitted so that the terminals 32 and 33 become the output or test terminals, the apparatus will serve to deliver at 32 and 33 a D. C. voltage varying in the same predetermined manner described above for an A. C. voltage.

The embodiment of the invention disclosed is illustrative and may be modified and departed from without departing from the spirit and scope of the invention as pointed out in and limited only by the appended claims.

What is claimed is:

1. In an electrical apparatus having input terminals and output terminals, a variable voltage output transformer to receive an electric current from the input terminals and deliver current modified thereby to the output terminals, a constant speed electric motor to drive the variable transformer to vary the voltage of the output thereof from a predetermined minimum to a predetermined maximum in a predetermined period of time, and a time delay relay to stop the said motor and to reverse the same.

2. In an electrical apparatus having input terminals and output terminals, a variable voltage output transformer to receive an electric current from the input terminals and deliver current modified thereby to the output terminals, a constant speed electric motor to drive the variable transformer to vary the voltage of the output thereof from a predetermined minimum to a predetermined maximum in a predetermined period of time, and a time delay relay including a second constant speed motor to stop the said motor for a predetermined time interval and to reverse the same.

3. In an electrical apparatus having input terminals and output terminals, a variable voltage output transformer to receive an electric current from the input terminals and deliver current modified thereby to the output terminals, a constant speed electric motor to drive the variable transformer to vary the voltage of the output thereof from a predetermined minimum to a predetermined maximum in a predetermined period of time, an adjustable speed device interposed between the motor and the transformer to adjustably vary the rate of change of voltage of the output thereof, and a time delay relay to stop the said motor and to reverse the same.

4. In an electrical apparatus having input terminals and output terminals, a variable voltage output transformer to receive an electric current from the input terminals and deliver current modified thereby to the output terminals, a constant speed electric motor to drive the variable transformer to vary the voltage of the output thereof from a predetermined minimum to a predetermined maximum in a predetermined period of time, a time delay relay including a second constant speed motor to stop the said motor for a predetermined time interval and to reverse the same, and an adjustable speed device connected to the second motor to adjustably vary the time interval of stoppage of the first motor.

5. In an electrical apparatus having input terminals and output terminals, a variable voltage output transformer to receive an electric current from the input terminals and deliver current modified thereby to the output terminals, a constant speed electric motor to drive the variable transformer to vary the voltage of the output thereof from a predetermined minimum to a predetermined maximum in a predetermined period of time, an adjustable speed device interposed between the motor and the transformer to adjustably vary the rate of change of voltage of the output thereof, a time delay relay including a second constant speed motor to stop the said motor for a predetermined time interval and to reverse the same, and an adjustable speed device connected to the second motor to adjustably vary the time interval of stoppage of the first motor.

6. In an electrical apparatus having input terminals and output terminals, a variable voltage output transformer to receive an electric current from the input terminals, an adjustable transformer to receive current from the variable transformer and deliver current to the output terminals, a constant speed electric motor to drive the variable transformer to vary the voltage of the output thereof from a predetermined minimum to a predetermined maximum in a predetermined period of time, and a time delay relay to stop the said motor and to reverse the same.

7. In an electrical apparatus having input terminals and output terminals, a variable voltage output transformer to receive an electric current from the input terminals, an adjustable transformer to receive current from the variable transformer and deliver current to the output terminals, a constant speed electric motor to drive the variable transformer to vary the voltage of the output thereof from a predetermined minimum to a predetermined maximum in a predetermined period of time, and a time delay relay including a second constant speed motor to stop the said motor for a predetermined time interval and to reverse the same.

8. In an electrical apparatus having input terminals and output terminals, a variable voltage output transformer to receive an electric current from the input terminals, an adjustable transformer to receive current from the variable transformer and deliver current to the output terminals, a constant speed electric motor to drive the variable transformer to vary the voltage of the output thereof from a predetermined minimum to a predetermined maximum in a predetermined period of time, an adjustable speed device interposed between the motor and the transformer to adjustably vary the rate of change of voltage of the output thereof, and a time delay relay to stop the said motor and to reverse the same.

9. In an electrical apparatus having input terminals and output terminals, a variable voltage output transformer to receive an electric current from the input terminals, an adjustable transformer to receive current from the variable transformer and deliver current to the output terminals, a constant speed electric motor to drive the variable transformer to vary the voltage of the output thereof from a predetermined minimum to a predetermined maximum in a predetermined period of time, a time delay relay including a second constant speed motor to stop the said motor for a predetermined time interval and to reverse the same, and an adjustable speed device connected to the second motor to adjustably vary the time interval of stoppage of the first motor.

10. In an electrical apparatus having input terminals and output terminals, a variable voltage output transformer to receive an electric current from the input terminals, an adjustable transformer to receive current from the variable transformer and deliver current to the output terminals, a constant speed electric motor to drive the variable transformer to vary the voltage of the output thereof from a predetermined minimum to a predetermined maximum in a predetermined period of time, an adjustable speed device interposed between the motor and the transformer to adjustably vary the rate of change of voltage of the output thereof, a time delay relay including a second constant speed motor to stop the said motor for a predetermined time interval and to reverse the same, and an adjustable speed device connected to the second motor to adjustably vary the time interval of stoppage of the first motor.

HENRY M. WOLFSON.